May 28, 1963

C. ALIMANESTIANO 3,091,661

ENTERTAINMENT SYSTEM

Filed May 12, 1960

INVENTOR.
CONSTANTIN ALIMANESTIANO
BY
Olson & Trexler
Attys

May 28, 1963 C. ALIMANESTIANO 3,091,661
ENTERTAINMENT SYSTEM
Filed May 12, 1960 3 Sheets-Sheet 2

INVENTOR.
CONSTANTIN ALIMANESTIANO
BY Olson & Trexler
attys

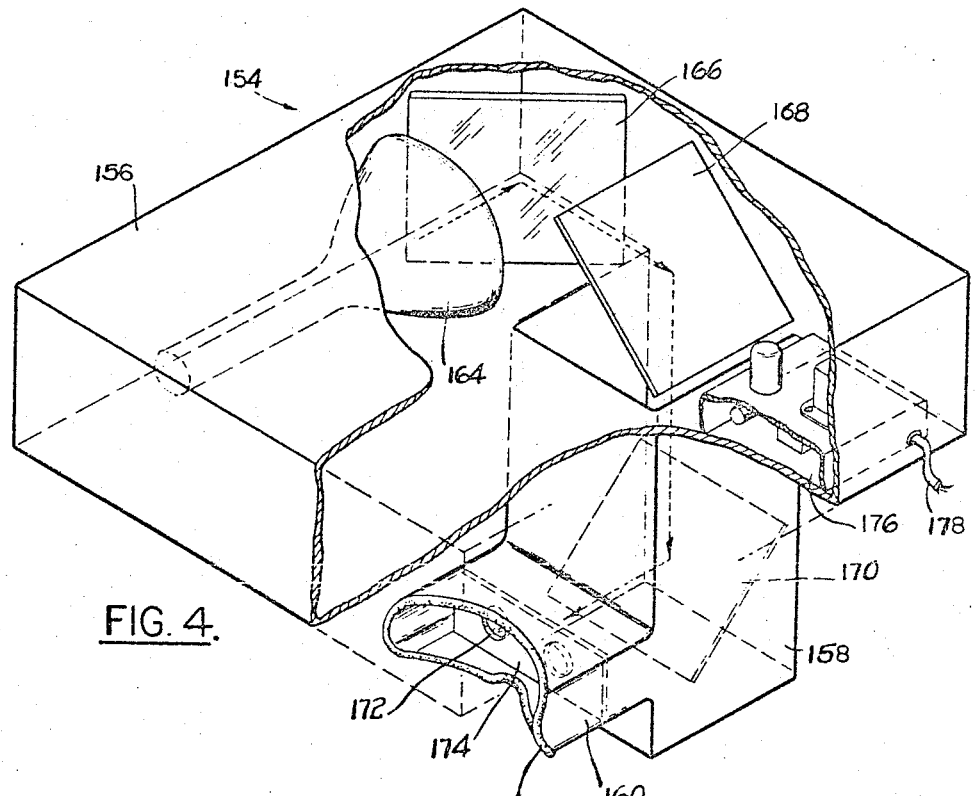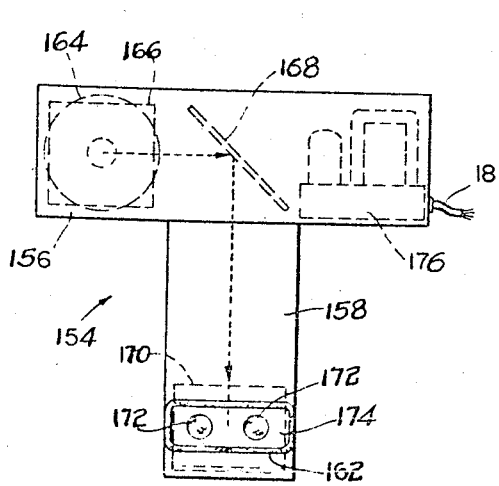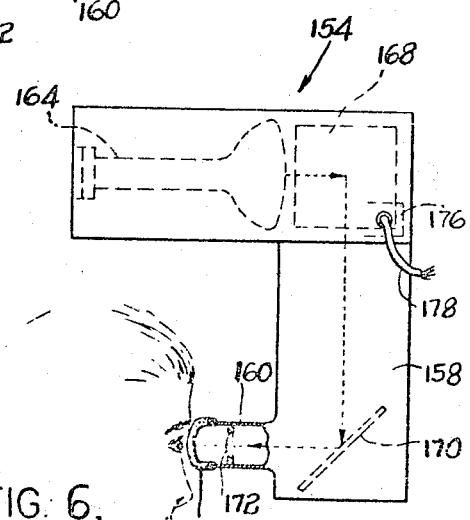

United States Patent Office 3,091,661
Patented May 28, 1963

3,091,661
ENTERTAINMENT SYSTEM
Constantin Alimanestiano, 2615 E. 74th St., Chicago, Ill.
Filed May 12, 1960, Ser. No. 28,614
3 Claims. (Cl. 178—6.8)

This invention relates generally to entertainment systems and more particularly to a portable entertainment system.

In one specific aspect, the present invention relates to an entertainment system incorporating a closed circuit television and adapted for use aboard passenger aircraft.

It is well known that traveling time can be shortened, actually, by increasing the speed of the transporting vehicle or, apparently, by providing divertissement for the traveler. Airlines, today, pursue both of these approaches; and at least one airline provides entertainment for their passengers by projecting movie films on a screen installed in the forward part of the cabin. This system has the disadvantage of compelling all passengers present to view the film. At least one other airline provides entertainment for their passengers by installing a conventional television receiver in the lounge of the airplane. This latter approach has encountered difficulties in sustaining proper reception of the broadcast television signals and is disadvantageous in that the lounge of an airplane is customarily small and can accommodate only a limited percentage of the total number of passengers aboard.

Therefore, an important object of the present invention is to provide a new and improved entertainment system which may be used aboard passenger aircraft.

Another object of the present invention is to provide such an entertainment system which is readily portable.

Yet another object of the invention is to provide an entertainment system which is selectively controllable by each individual passenger.

Still another object of the invention is to provide an entertainment system in which each passenger is entertained at his own, regular seat.

And still another object of the invention is to provide a portable entertainment system which is fully automatic.

The entertainment system of the present invention is particularly useful when, for financial, organizational or other reasons, it is mandatory to enumerate or control the number of individuals witnessing a particular entertainment. Commonly, stage production contracts are tied to the number of spectators involved and enumeration is kept by means of ticket sales. Accordingly, filming of stage productions while they are being actively performed has heretofore been prevented by the absence of adequate methods for determining the number of ultimate viewers of the film. Concomitantly, audiences have been restricted to the seating capacity of given theaters and much potential business has been lost.

Therefore, a further object of the present invention is to provide a new and improved entertainment system which enables the keeping of accurate count on the number of individuals witnessing the divertissement.

Additional objects and features of the invention pertain to the particular structures and arrangements whereby the above objects are attained.

A system in accord with the invention includes portable housing means, photographic projection apparatus resiliently mounted in the housing means, television camera means resiliently mounted in the housing means for receiving the image projected by the photographic projection apparatus and for generating an output indicative thereof, means metering the operation of the projection apparatus, a plurality of individual television receiver means selectively connectable to the output of the television camera means, and means metering the connections made between the receiver means and the output of the television camera means.

The invention, both to its structure and mode of operation, will be better understood by reference to the following disclosure and drawings forming a part thereof, wherein:

FIG. 4 is a cut-away perspective view of a modified, individual television receiver means for use in the system of the invention;

FIG. 5 is a reduced, front-elevational view of the apparatus of FIG. 4; and

FIG. 6 is a reduced, side-elevational view, partially in invisible outline of the apparatus of FIG. 4.

Figure 1:
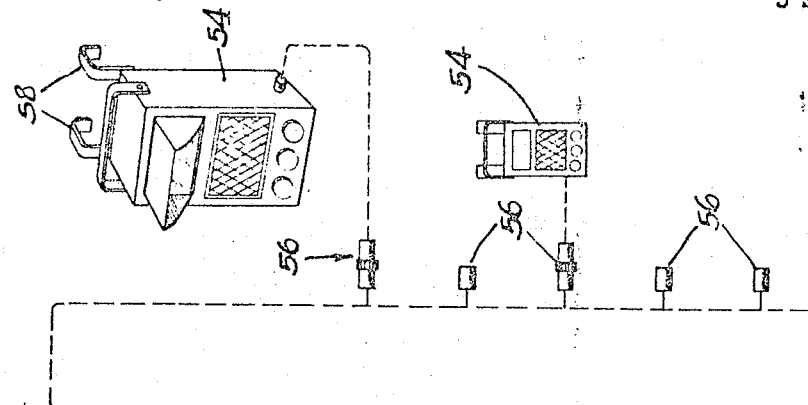
FIG. 1 is a perspective view of housing means cut away to reveal details of one embodiment of the entertainment system of the invention.
Figure 1:
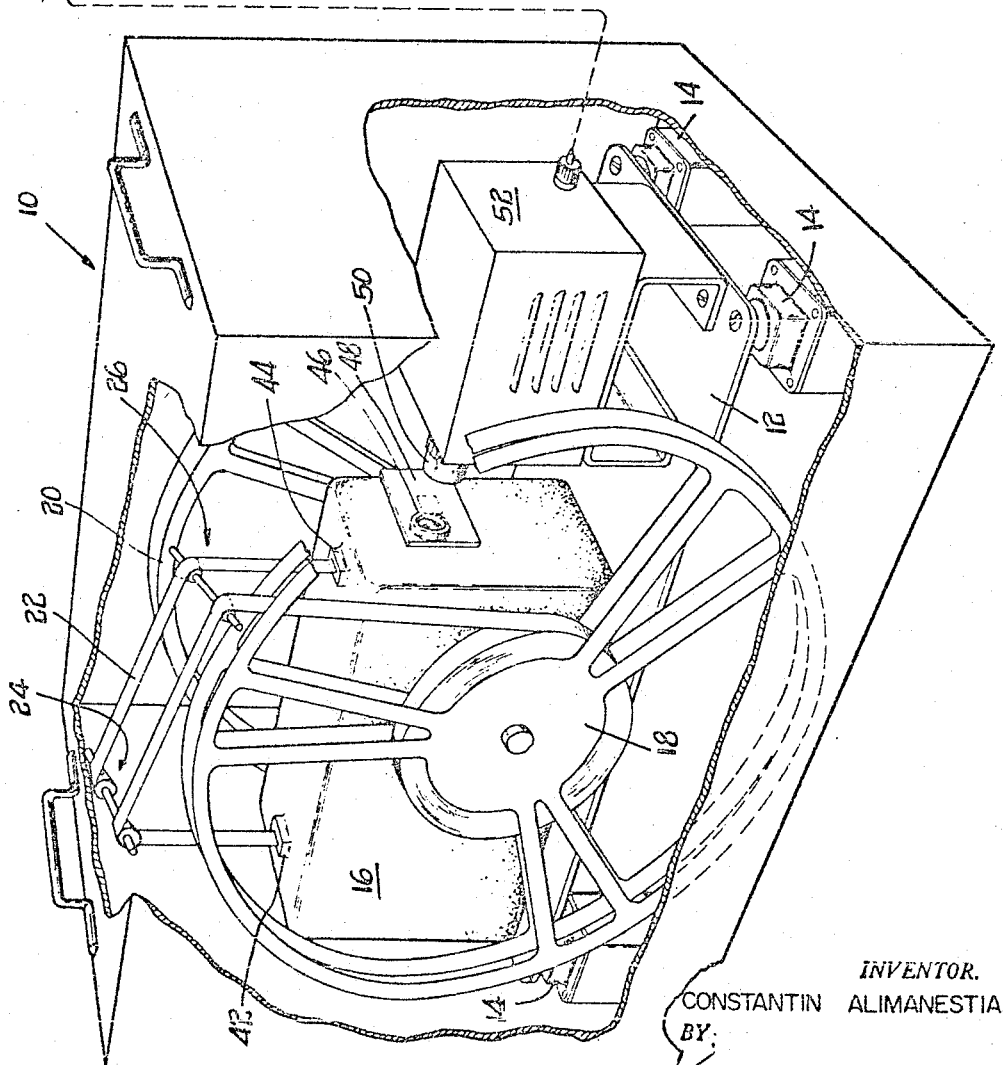

Referring now in detail to the drawings, specifically to FIG. 1, an entertainment system constructed in accordance with one embodiment of the invention includes a portable housing indicated generally by the numeral 10. Within the housing 10, a platform 12 is resiliently mounted as by vibration damping shock mounts 14 of the metal mesh or any other suitable type. In accord with the invention, photographic projection apparatus is mounted within the housing 10. Specifically, a motion picture projector 16 is fastened to the platform 12 while a film delivery reel 18 and a film take-up reel 20 are mounted on opposite lateral sides of the projector 16. This manner of mounting the reels 18 and 20 ensures overall compactness and easy portability of the housing 10 and its contents.

Figure 2:
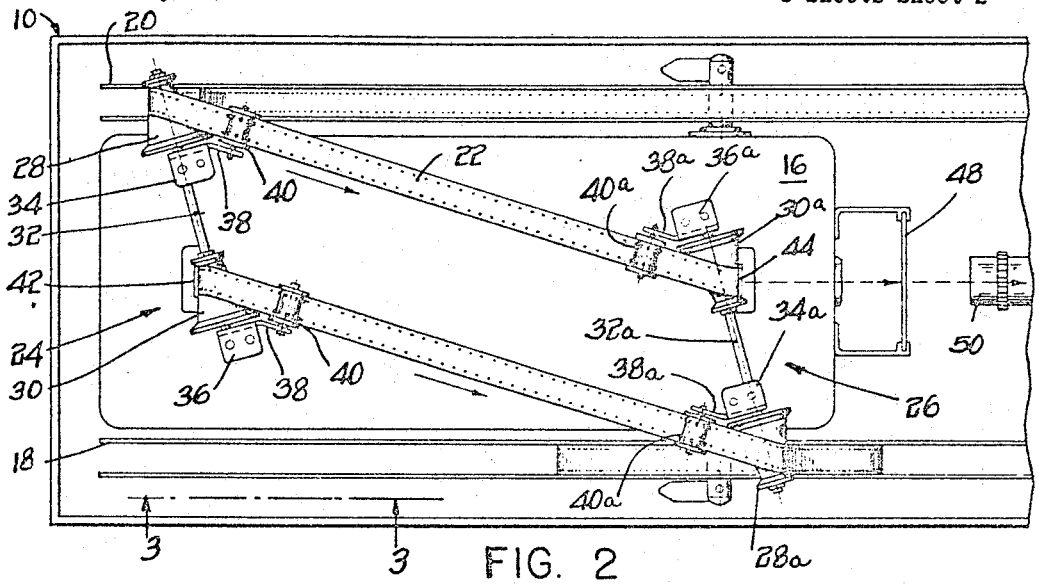
FIG. 2 is a fragmentary, plan view of the arrangement of FIG. 1 showing the film guiding means.
Figure 3:
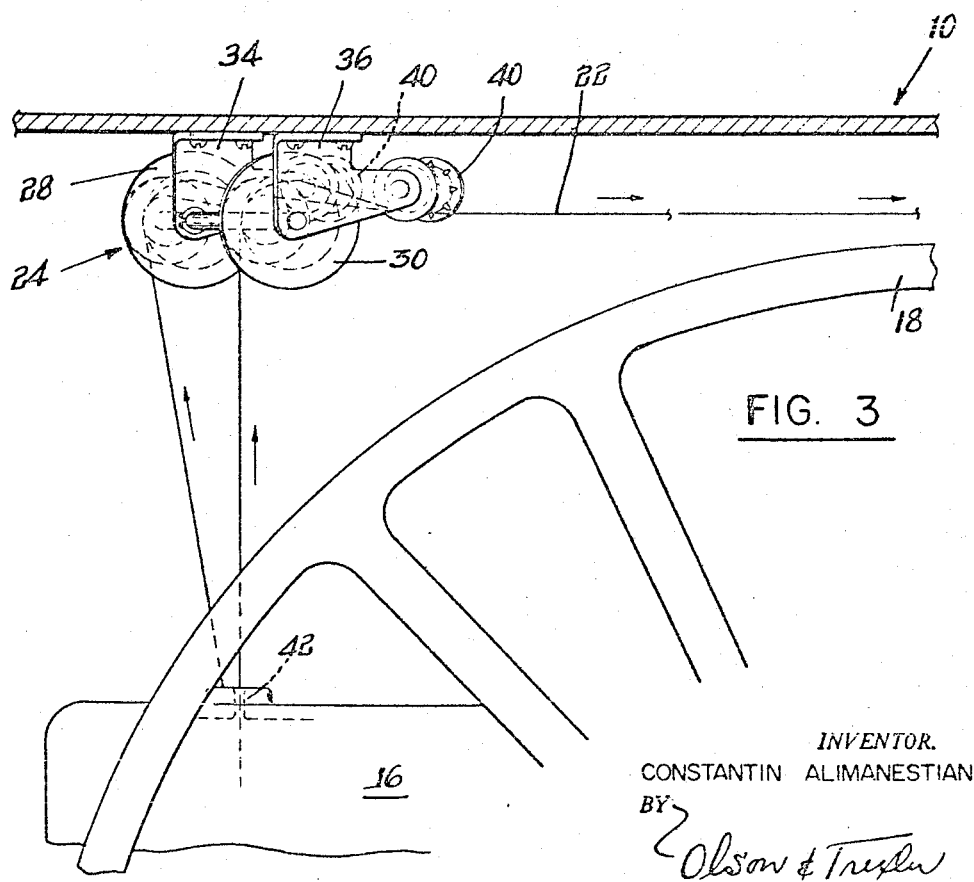
FIG. 3 is an enlarged view taken through the section 3—3 of FIG. 2.

In compliance with a feature of the invention, film guiding means are provided for directing a motion picture film 22 between the reels 18 and 20 and through the projector 16. These film guiding means include two sets of oppositely oriented rollers, sets 24 and 26; and as will be seen from an inspection of FIG. 2, the roller set 24 includes a conical roller 28 and a conical roller 30 rotatably mounted in spaced relationship on a common shaft 32, the shaft 32 being supported in brackets 34 and 36. The brackets 34 and 36 are mounted, in turn, to the roof of housing 10 by screws or other suitable means, as is indicated in FIG. 3.

Advantageously, the bracket 34 and the bracket 36 are provided with extensions 38; and sprockets 40 are rotatably mounted to these extensions 38 for controlling and directing the transport of motion picture film 22 in compliance with customary practice.

Roller set 26 is comprised similarly to roller set 24; and accordingly, like numerals have been employed to designate like elements in the sets 24 and 26, the suffix letter "a" being employed to distinguish those elements associated with the roller set 26.

It is to be noted that shafts 32 and 32a are disposed parallel to each other and at an angle relative to the disposition of the rotational axes of reels 18 and 20. This relative angular disposition of the shafts 32 and 32a, when coupled with the conical nature of the rollers and with the opposite orientation of the roller sets 24 and 26, permits transport of the film 22 in the three vertical planes defined respectively by the reel 18, the reel 20 and the projection track within the motion picture projector 16. As will be seen in FIGS. 1 and 2, the film track within the motion picture projector 16 terminates in film-passing apertures 42 and 44.

Continuing with special reference to FIG. 1, the projection lens 46 of motion pictures projector 16 will be seen arranged to direct the image from the film 22 through an apertured plate 48 to the lens system 50 of a television camera 52. It is to be observed that the television camera 52 is mounted on platform 12 in optical alignment with the projector 16 in order to receive the image projected therefrom; and in accordance with the invention, the output of television camera 52 is selectively connectable to a number of individual television receivers 54 as by means of connector elements 56.

The receivers 54 comprise standard miniature television receivers which are adapted to be mounted in readily viewable disposition at the regular seat of a passenger who desires to be entertained. Brackets 58 are provided for this purpose; and in compliance with a feature of the invention, means are provided for metering or registering the specific number of individual receivers 54 which are connected to the output of television camera 52. Moreover, the projector 16 is arranged to meter or register the number of complete passes which the motion picture film 22 makes therethrough.

Turning now to FIGS. 4-6, a modified embodiment of the television receiver means is shown provided and arranged for occasions wherein an individual passenger will prefer to use a personal viewer rather than a screen. The modified embodiment of television receiver means is generally indicated by the numeral 154 and will be seen to include a housing 156 from which a periscope tunnel 158 depends in order to situate a personal viewer element 160 in position for ready and convenient use. The exterior, open end of viewer element 160 is advantageously rimmed with a resilient molding 162 desirably fabricated from sponge rubber or other suitable material.

An electronic picture tube 164 is mounted within the receiver means 154; and optical means, such as the front surface silvered mirrors 166, 168 and 170, are provided for directing the image displayed on the picture tube 164 to the remotely disposed viewer element 160. Advantageously, light lenses 172 are secured to a mounting plate 174 within viewer element 160 for aid in satisfactorily viewing the image transmitted by the mirrors 166, 168 and 170. It is recognized that prisms may be readily substituted for the mirrors.

Advantageously, a signal receiving apparatus 176 is mounted within the housing 156 to receive the output of television camera 52 as through a lead cable 178. If desired, signal receiving apparatus 176 may also be adapted to receive an audio signal and to drive a loudspeaker or earphones, not shown.

Operation of the entertainment system of the invention will be apparent from the foregoing disclosure; and from the descriptions given, it will be recognized that the invention affords a highly desirable means for entertaining airline passengers in a personal and selective manner at their regular seats whereby to break the monotony of a long journey. In addition, it will become apparent that the invention is permissive of the showing of stage and theater productions to a virtually unlimited number of individuals within the business parameters which exist for such productions.

While particular embodiments of the invention have been shown, it should be understood, of course, that the invention is not limited thereto since many modifications may be made; and it is, therefore, contemplated to cover by the appended claims any such modifications as fall within the true spirit and scope of the invention.

The invention is claimed as follows:

1. A portable entertainment system comprising: housing means; photographic projection apparatus mounted in said housing means and including a motion picture projector, a film delivery reel and a film take-up reel rotatably mounted on opposite lateral sides of said projector, and film guiding means for directing motion picture film from one of said reels to the other of said reels through said projector, said film guiding means including two sets of oppositely oriented rollers, each of said rollers having a cylindrical sprocket means associated therewith for controllably directing the transport of said film; television camera means mounted in said housing means for receiving the image projected by said apparatus and for generating an output indicative thereof; and a plurality of individual television receiver means selectively connectable to said output.

2. A portable entertainment system adapted for use aboard passenger aircraft comprising: housing means; photographic projection apparatus resiliently mounted in said housing means and including a motion picture projector, a film delivery reel and a film take-up reel rotatably mounted on opposite lateral sides of said projector, and film guiding means for directing motion picture film from one of said reels to the other of said reels through said projector, said film guiding means including two sets of oppositely oriented, conical rollers, each of said rollers having a cylindrical sprocket means associated therewith for controllably directing the transport of said film; television camera means resiliently mounted in said housing means for receiving the image projected by said apparatus and for generating an output indicative thereof; means metering the operation of said projection apparatus; a plurality of individual television receiver means selectively connectable to said output; and means metering the connections made between said receiver means and said output.

3. A portable entertainment system in accordance with claim 2 wherein said television receiver means includes a television picture tube, a personal viewer remotely disposed from said tube and optical means directing an image from said tube to said viewer.

References Cited in the file of this patent
UNITED STATES PATENTS

| | | |
|---|---|---|
| 2,031,075 | Scheibell | Feb. 18, 1936 |
| 2,292,307 | Warner | Aug. 4, 1942 |